(12) United States Patent
Zhu et al.

(10) Patent No.: US 7,393,565 B2
(45) Date of Patent: Jul. 1, 2008

(54) ASSEMBLY OF CARBON TUBE-IN-TUBE NANOSTRUCTURES

(75) Inventors: Zhenping Zhu, Taiyuan (CN); Dangsheng Su, Berlin (DE); Robert Schlögl, Berlin (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 75 days.

(21) Appl. No.: 11/113,327

(22) Filed: Apr. 25, 2005

(65) Prior Publication Data

US 2005/0255321 A1 Nov. 17, 2005

(51) Int. Cl.
*B05D 3/02* (2006.01)
*B05D 7/00* (2006.01)
(52) U.S. Cl. .................................. 427/402; 427/372.2

(58) Field of Classification Search .............. 427/372.2, 427/402
See application file for complete search history.

(56) References Cited

OTHER PUBLICATIONS

Che et al., "Carbon Nanotubule Membranes for Electrochemical Energy Storage and Production", NATURE, vol. 393, No. 6683, May 28, 1998, pp. 346-349.
Luzzie et al., "Carbon case structures in single wall carbon nanotubes: a new class of materials", CARBON, vol. 38, No. 11-12, 2000, pp. 1751-1756.
Whitby et al., "WS2 nanotubes containing single-walled carbon nanotube bundles" Applied Physics Letters, vol. 79, No. 27, Dec. 31, 2001, pp. 4574-4576.

*Primary Examiner*—Elena Tsoy
(74) *Attorney, Agent, or Firm*—Rothwell, Figg, Ernst & Manbeck, P.C.

(57) ABSTRACT

The present invention relates to a method for assembling carbon tube-in-tube nanostructures and the products obtained thereby.

18 Claims, 7 Drawing Sheets

ASSEMBLY OF CARBON TUBE-IN-TUBE NANOSTRUCTURES

The present invention relates to a method for assembling carbon tube-in-tube nanostructures and the products obtained thereby.

The surface and channel accessibility of carbon nanotubes (CNTs) bestow them with wide applications in catalysis,[1-4] gas sensing,[5-7] and template-based assembly of heterostructures.[8-11] Carbon tube-in-tube (CTIT) nanostructures, built by a narrower inner tube inside an outer tube, exhibit multiple intramolecular channels and surfaces and should be beneficial for the improvement of their properties. It was indeed found that $Li^+$ ion intercalation capacity of tube-in-tube member is two times higher than that of the normal tube member.[1] Unlike its counterpart CNTs that can be fabricated in many ways,[12-15] the CTIT structure is difficult to assemble. The current strategy is the high-temperature growth of the inner tube moieties catalyzed by the iron nanoparticles deposited within pristine tubes.[1] However, it is difficult to selectively bring desired number of catalyst particles into the tubes, and the resulted CTITs seem to be not finely organized.

Carbonaceous impurities, amorphous and graphitic nanoparticles, are always present in as-synthesized samples of CNTs, independent of the synthesis methods. The presence of these impurities hampers the accurate characterization of the bulk properties of nanotubes and affects their practical applications. To remove these impurities, various purification methods have been developed.[16-22] However, most of the carbonaceous impurities (graphitic nanoparticles) exhibit structures similar to those of nanotubes and most of the grown nanotubes are highly defective,[23] rendering the purification difficult and causing severe damage and loss of nanotubes. For example, in the case of purification by air or oxygen at high temperatures, more than 99% of the raw material have to be burned off to completely remove the graphitic nanoparticies[16]. Furthermore, the carbonaceous impurities not only exist in the outer inter-tubular volume but also are frequently in the inner voids of tubes[23-25]. These internal impurities are more resistant and survive even deep oxidation that causes severe damage to the tubes (so called "wall thinning")[9,26].

According to the present invention it was surprisingly found that external and internal impurities around and inside of pristine carbon tubes can be reorganized to assemble CTIT structures. The use of reoganization procedures has been previously reported for the CNT-templated assembly of inorganic nanotubes[8,10] and for the transformation of $C_{60}$-filled single-walled tubes into double-walled tubes[27,28]. It was, however, completely unexpected that a reorganization procedure would result in well-ordered CTIT structures having a low content of impurities.

Figure 1:
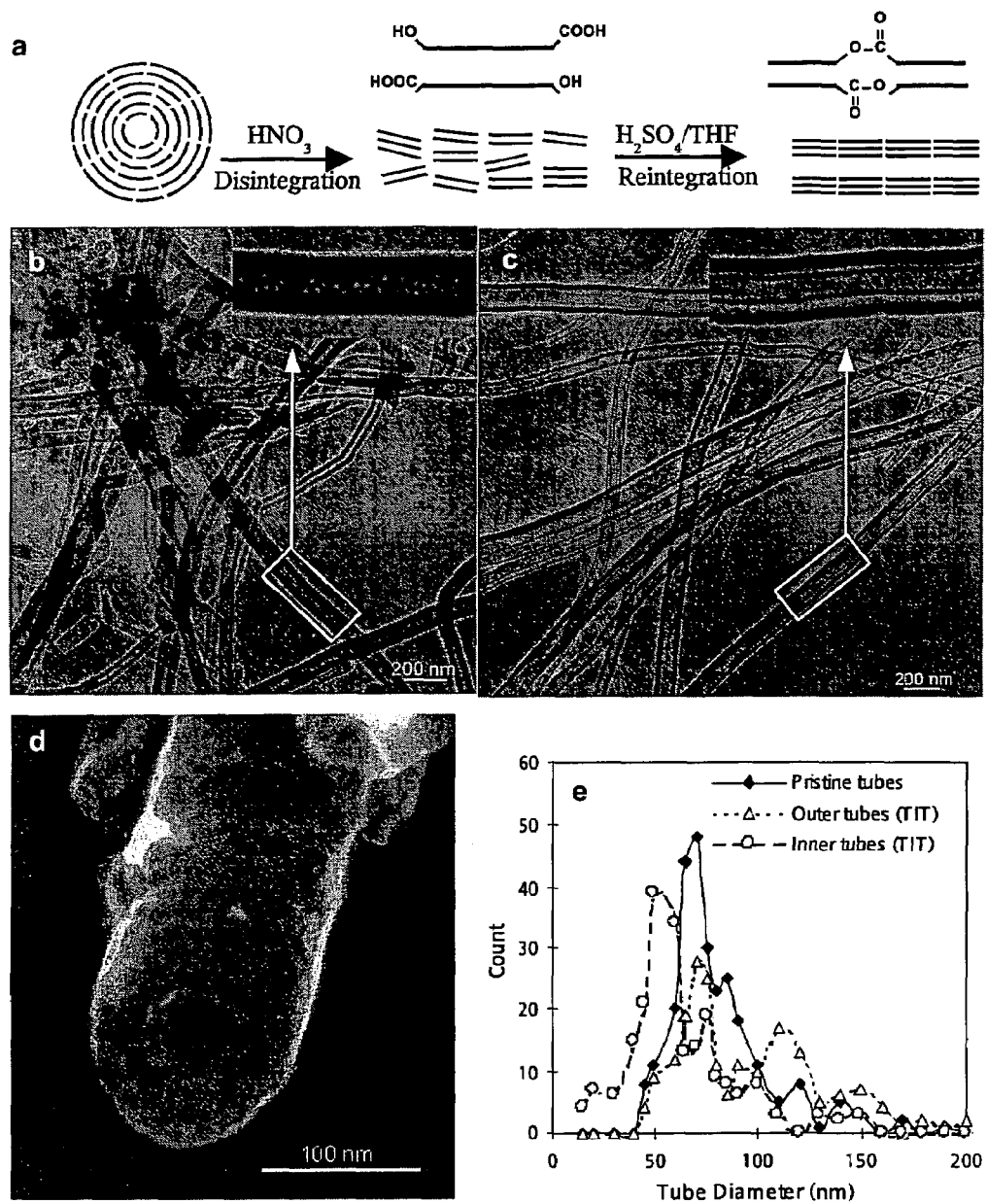

The strategy for the reorganization is based on a two-step process (FIG. 1(a)). First, the graphitic nanoparticles are disintegrated into small fragments, e.g. by an $HNO_3$-based oxidation at defective sites, a process previously used to purify, cut, or open nanotubes[11,17-19]. The oxidation concomitantly functionalizes the fragment edges with chemically reactive groups, e.g. carboxyl and hydroxyl groups[29]. Secondly, the small graphene fragments are reintegrated around or inside pristine nanotubes to assemble CTITs by forming linkages, e.g. acid-catalyzed esterification linkages between the chemically reactive groups.

Thus, the present invention relates to a method for producing a carbon tube-in-tube (CTIT) nanostructure material comprising the steps: (a) subjecting a carbon nanostructure (CNT) starting material to a functionalization procedure, wherein CNT fragments with chemically reactive groups are obtained; (b) assembling said carbon nanotube fragments to a CTIT nanostructure material by forming bonds between said chemically reactive groups on said CNT fragments, and (c) optionally subjecting the CTIT nanostructure material to a thermal treatment.

The starting material for the method of the invention are carbon nanobubes (CNTs). CNTs have been described previously and are commercially available, e.g. from Applied Science Ltd., Ohio, USA. Preferably, the CNT starting material comprises tubes with an average diameter of about 40-120 nm, preferably of about 60-80 nm. The CNT starting material preferably contains carbonaceous impurities, e.g. amorphous and/or graphitic nanoparticles which may be subjected to a reorganization procedure which results in the formation of CTITs. Thus, the CNT starting material preferably is an as-synthesized sample which has not been subjected to any purification procedure. The content of impurities preferably is about 5 to about 40% based on the weight of the total CNT starting material.

The first step in the method of the invention is a functionalization procedure, wherein CNT fragments with chemically reactive groups are obtained.

Preferably, the functionalization procedure comprises an oxidation, wherein CNT fragments with hydroxyl and/or carboxyl groups are formed. More preferably, the oxidation comprises heating with $HNO_3$ or $HNO_3/H_2SO_4$. For example, the oxidation comprises treatment with concentrated $HNO_3$ at reflux temperature for about 1 to about 48 h. A further example of a functionalization procedure comprises treatment with a solution of $HNO_3$ and $H_2SO_4$, wherein the volume ration of $HNO_3$ to $H_2SO_4$ is preferably 0.2-5:1.

The second step of the present invention is an assembling procedure, wherein carbon nanotube fragments are assembled to a CTIT nanostructure material by forming bonds between the chemically reactive groups on the CNT fragments. Preferably, the assembling procedure comprises an esterification, wherein ester bonds are formed between hydroxyl and carboxyl groups on the CNT fragments. The esterification preferably comprises heating in the presence of an esterification catalyst, e.g. an acid in a suitable concentration to promote the formation of ester bonds between CNT fragments. More preferably, the catalyst is concentrated $H_2SO_4$.

The assembling procedure comprises forming carbon tubes around and/or within the carbon tube from the CNT starting material. Thus, the assembling procedure preferably comprises:

(i) forming a tube with a higher average diameter compared to the CNT starting material around a tube with about the same diameter as the CNT starting material;

(ii) forming a tube with a lower average diameter compared to the CNT starting material within a tube with about the same diameter as the CNT starting material; and/or (iii) a combination of (i) and (ii).

The third optional step comprises a thermal treatment. The thermal treatment is preferably carried out by heating the CTIT nanostructure material obtained in step (b) at temperatures of 800° C. or higher, preferably at temperatures of 1000° C. to 2800° C. in an inert, e.g. $N_2$, Ar and/or He atmosphere. The thermal treatment leads to a structural condensation and/or improvement by an at least partial removal of heteroatoms which are present in the CTIT structure due to the formation of bonds between chemically reactive groups on the CNT fragments obtained in the functionalization (a). Step (c) may comprise a partial or substantially complete removal of heteroatoms.

In a preferred embodiment the CTIT nanostructures comprise (i) an inner tube with an average diameter of about 10-60 nm, preferably of about 15-50 nm; and (ii) an outer tube with an average diameter of about 60-80 nm, preferably of about 70 nm.

In a further preferred embodiment the CTIT nanostructures comprise (i) an inner tube with an average diameter of about 60-80 nm, preferably of about 70 nm; and (ii) an outer tube with an average diameter of about 100-150 nm, preferably of about 110 nm.

In still another preferred embodiment the CTIT nanostructures comprise (i) an inner tube with an average diameter of about 10-60 nm, preferably of about 15-50 nm, (ii) an intermediate tube with an average diameter of about 60-80 nm, preferably of about 70 nm and (iii) an outer tube with an average diameter of about 100-150 nm, preferably of about 110 nm.

The method of the invention further may comprise incorporating a heterologous material into the CTIT nanostructures. The heterologous material may comprise metals or metal compounds, iron, nickel or cobalt, or iron, nickel or cobalt compounds or other transition metals or metal compounds, alkaline metal compounds or alkaline earth metal compounds. The metals or metal compounds may be present in elemental form or as oxides or salts.

For the incorporation of heterologous material into the CTIT structures, the heterologous materials or precursors thereof are preferably contacted with the CTIT nanostructures in a suitable fluidic, e.g. aqueous and/or gaseous medium under suitable conditions of temperature. For example, metal ions may be deposited in the CTIT structures by heating a metal salt solution in the presence of the CTIT structures.

A further aspect of the present invention is a CTIT nanostructure material obtainable by the method as described above.

A still further aspect of the present invention is a CTIT nanostructure material, wherein at least one tube comprises carbon nanotube fragments assembled by bonds between chemically reactive groups on said fragments. Preferably, the bonds are ester bonds between hydroxyl and carboxyl groups.

The tubes of the CTIT material preferably have an average length of about 0.5 μm to about 50 μm. Further, it is preferred that the tube-in-tube structure extends about substantially the whole length of the material. As outlined above, the CTIT nanostructure material may comprise heterologous material incorporated into the nanostructures.

The CTIT nanostructures are further characterized by the presence of only small amounts of carbonaceous impurities, since a high percentage of these impurities present in the starting material are reorganized into CNT fragments and subsequently assembled into the CTIT structure. Thus, the amount of carbonaceous impurities is preferably less than 2-10%, more preferably less than about 5% based on the total weight of the material.

The CTIT nanostructure material of the present invention may be used as a catalyst, catalyst support, electrode material, in gas sensing operations, for gas storage or as templates for the assembly of heterostructures.

The invention shall be further illustrated by the following Figures and Examples.

FIGURE LEGENDS

FIG. 1(a) Schematic illustration of reorganizing graphitic nanoparticles into new tube moieties of CTIT structures. (b) TEM image of the raw carbon nanotube sample, with carbonaceous impurities both external to and inside the cavities of the nanotubes. (c) TEM image of the materials after the $HNO_3$-based oxidation and subsequent esterification reactions, showing the transformation of a large fraction of the normal tubes to tube-in-tube encasing structures. (d) SEM image of the end of a typical tube-in-tube assembly, confirming the encasing tubular structure. (e) Diameter distribution of the pristine nanotubes and the outer and inner tube moieties of the assembled CTITs.

Figure 2:
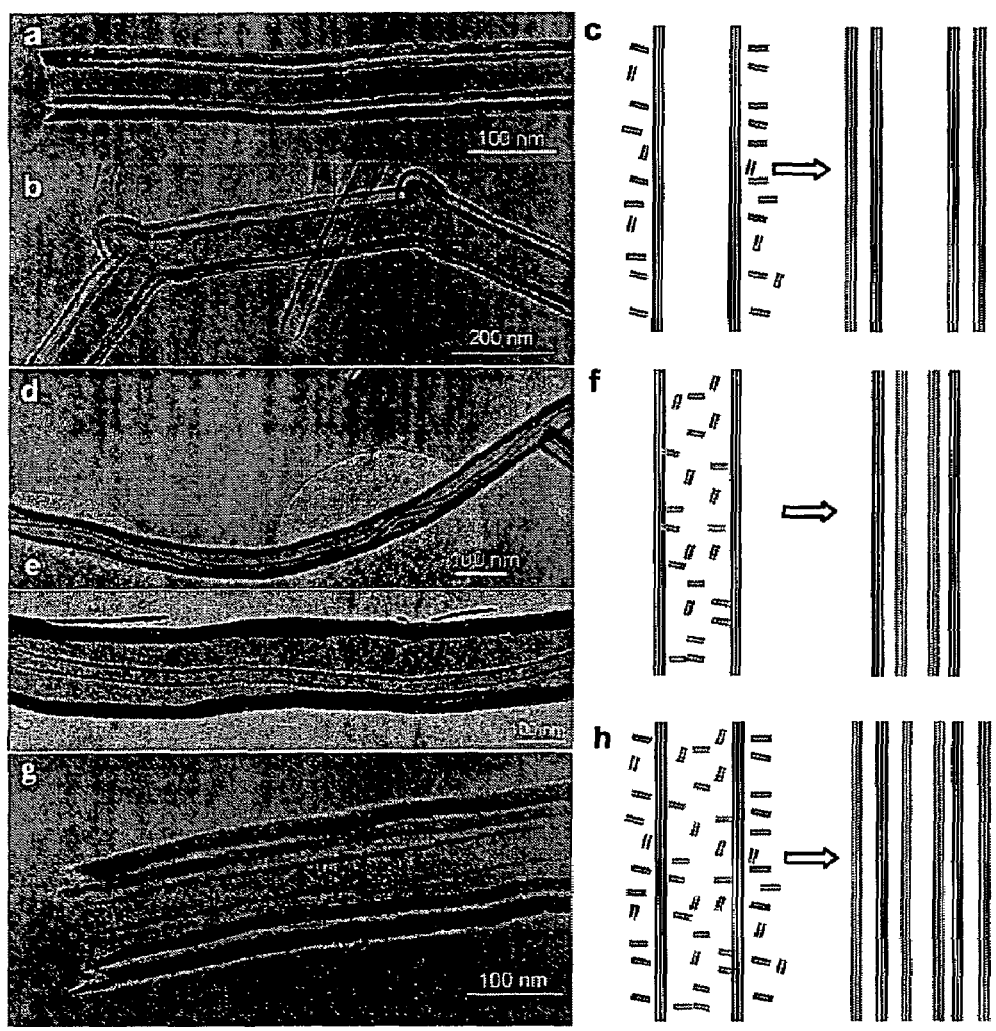

FIGS. 2(a, b) TEM images of the CTITs that have relatively small and uniform interval spaces and exhibit similar morphologies between the inner and outer tube moieties, which are likely produced from the assembly of the graphitic fragments around the pristine tubes as schemed in (c). (d, e) TEM images of the CTITs that show large and highly irregular interval spaces and contain very thin inner tubes (15 nm in (d) and 32 nm in (e)). This type of CTITs is formed from the assembly of the graphitic fragments within the pristine tubes as schemed in (f). (g) TEM image of a typical triple tube-in-tube structure, formed from integrating the graphitic fragments both around and inside pristine tubes as schematized in (h).

Figure 3:
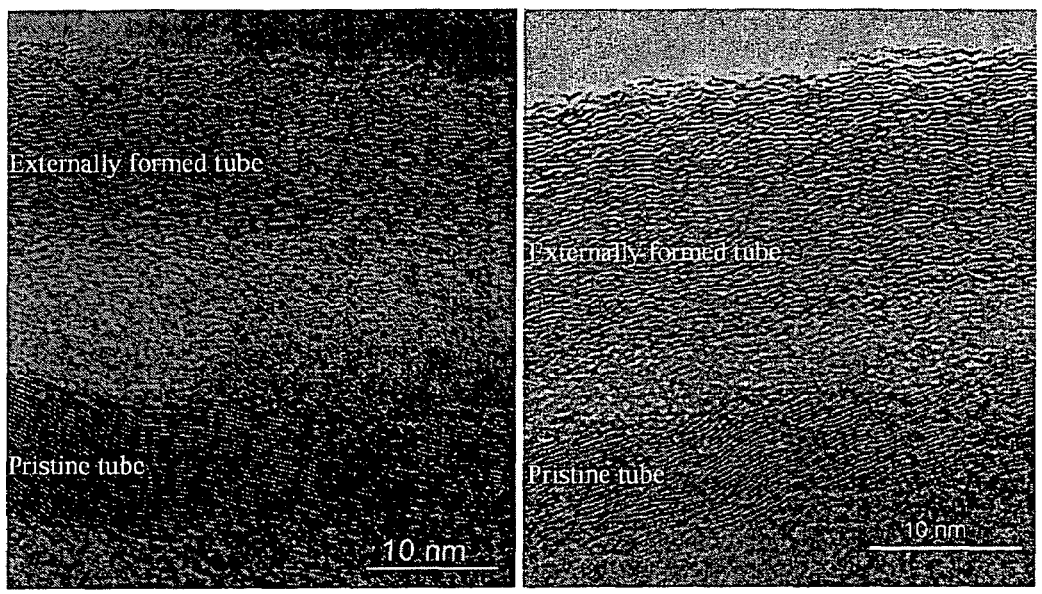

FIG. 3 High-resolution TEM images of the walls of dual CTITs before (a) and after (b) thermal treatment at 1000° C. in 1 atm Ar atmosphere for 20 hours.

Figure 4:
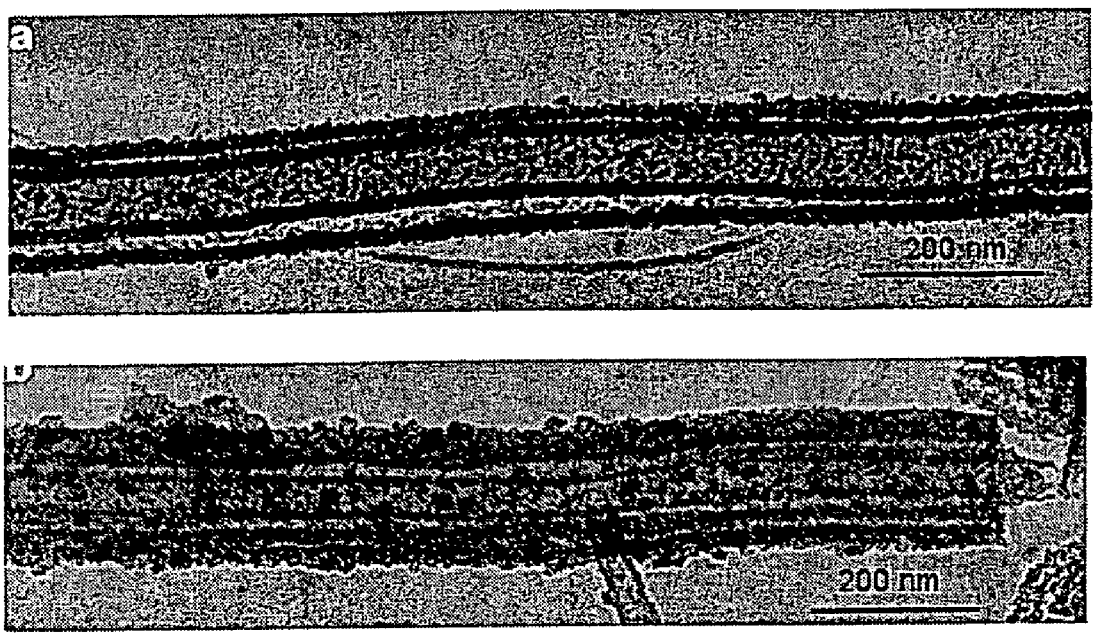

FIG. 4 TEM images of dual (a) and triple (b) CTITs filled and coated with uniform small iron oxide nanoparticles.

Figure 5:
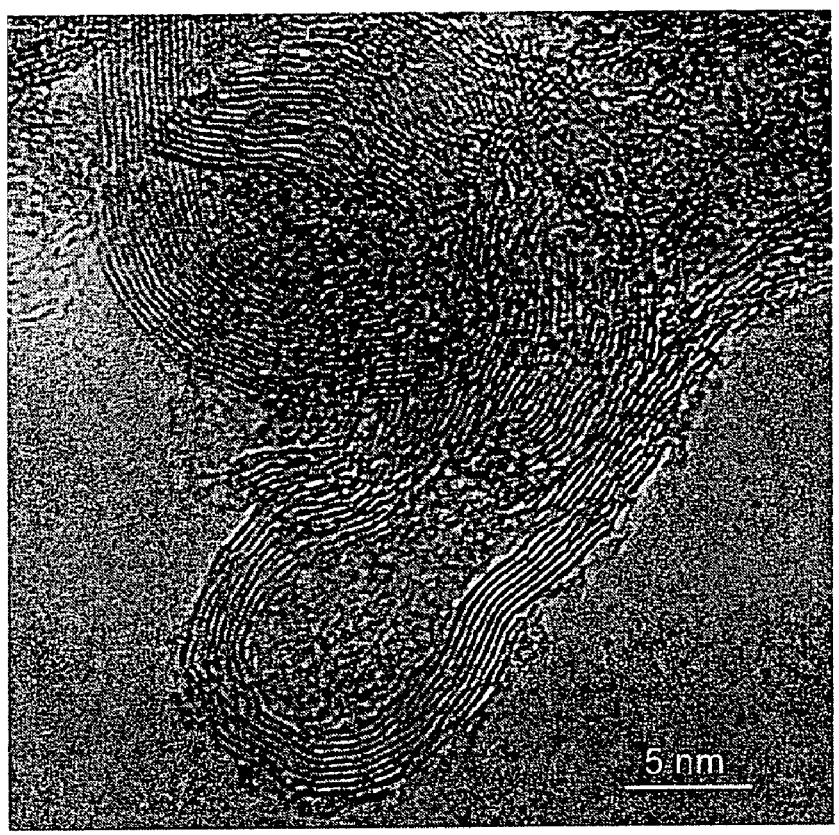

FIG. 5. High-resolution TEM image of typical carbon impurity particles, showing a graphene structure, similar to the structures of nanotube walls. It also shows that there are many discontinued defects in the structure, which provide preferable sites for the attack of oxidative $HNO_3$ molecules and the disintegration of the nanoparticles to small graphene fragments.

Figure 6:
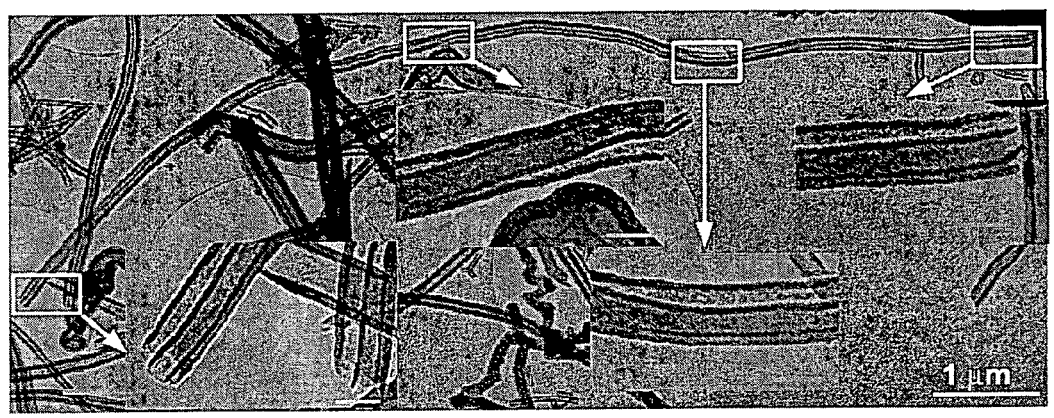

FIG. 6. TEM image of a CTIT with length of about 18 μm. The insets are the enlarged images of different parts of the CTIT, indicating that the tube-in-tube assembly is continued along the entire tube length.

Figure 7:
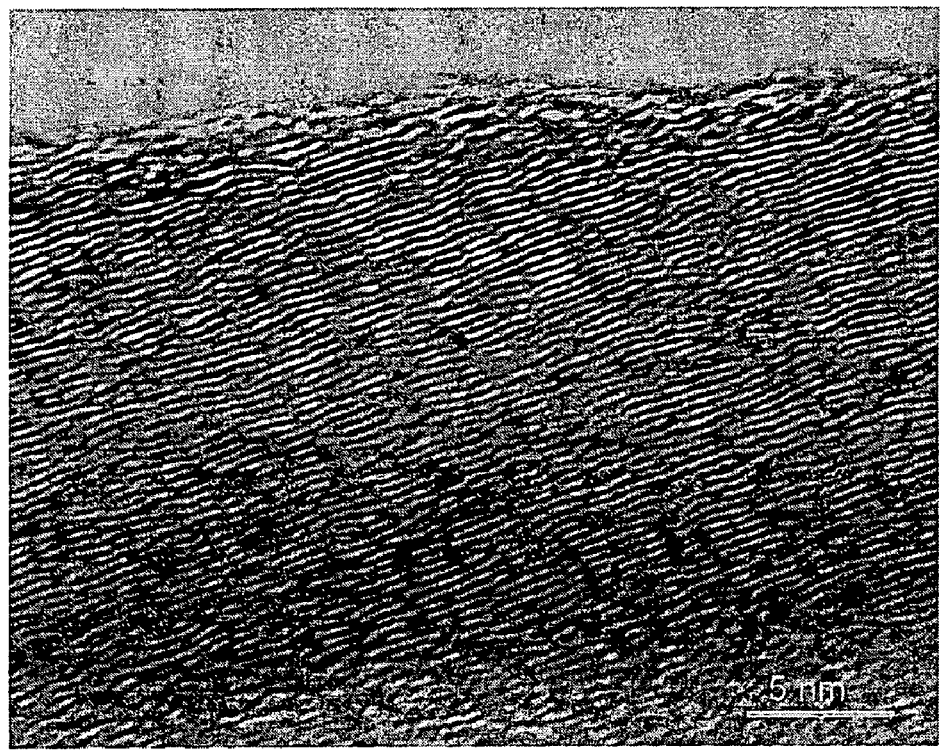

FIG. 7. A typical High-resolution TEM image of tube wall taken from the $HNO_3$-oxidized sample (before CTIT assembly), showing a fishbone-like graphene structure, with interlayer distance of 0.34 nm.

EXAMPLE

1. Experimental Section

The procedure for assembling CTITs consists of two steps, oxidation and esterification. 3.7 g of raw CNT sample (Applied Science Ltd., Ohio, USA) was combined with 300 ml concentrated $HNO_3$ and magnetically stirred and oxidized for 16 h under refluxing conditions. After filtration, the remaining solid was washed sequentially with deionized water and ethanol and dried at 110° C. in air for 12 h, with a yield of 58%. To assemble the CTITs, 50 mg of the oxidized sample was dispersed in 50 ml tetrahydrofuran (THF) by magnetic stirring for 40 min at room temperature. 0.2 ml of concentrated $H_2SO_4$ was added to the resulted suspension and refluxed for 10 h to allow a full re-integration of the carboxyl-hydroxyl-modified graphene fragments through an esterification linkage, in which $H_2SO_4$ served as the acid catalyst. After the reaction, the suspension was filtered, washed with ethanol, and dried at 110° C. in air for 12 h.

To fill and coat the tube-in-tube nanostructures with iron oxide nanoparticles, 50 mg CTIT sample was dispersed in 50 ml 0.3 M $Fe(NO_3)_3$ aqueous solution and refluxed for 5 hours to allow the salts fully hydrolyzed. After the refluxing, the suspension was filtrated, washed with deionized water and ethanol, and dried at 110° C. for 12 h.

SEM images were taken using a Hitachi S4000 scanning electron microscope with a field-emission gun operated at 15-kV accelerating voltage. TEM images and electron diffraction patterns were taken using a Phillips CM200 FEG microscope operated at 200 kV. The samples were prepared by placing one drop of the alcohol suspension on a silicon substrate for SEM analyses or on a carbon-film-supported copper grid for TEM analyses.

2. Results

The CNTs used here are commercial products, i.e. nanotubes which are multi-walled. Carbonaceous impurities are present both external to and inside the nanotubes (FIG. 1b), and show graphitic structures similar to the tube walls (FIG. 5). Compared to the initial materials (FIG. 1b), the products after the oxidation-esterification processes show dramatic changes in composition and structures, as observed by transmission electron microscopy (TEM) (FIG. 1c). Carbonaceous impurities are significantly reduced both external to the tubes and in the cavities of the tubes. A large amount of tube-in-tube encasing structures are formed. From the TEM observations, we estimate that about 70% of the pristine nanotubes are assembled into CTITs. The CTITs are well constructed, with uniform wall thickness and large interval spaces between the outer and inner tubes. The construction is continued along the entire length of the tubes (FIG. 6). Scanning electron microscope (SEM) images (e.g. FIG. 1d) of the tube ends further confirm the encasing structures of nanotubes and reveal that the structures are normally open ended.

The CTITs exhibit two-peaked diameter distributions for both outer and inner tube moieties (FIG. 1e). One of the two peaks is located at about 70 nm for both cases, which is consistent with the most popular diameter of the pristine nanotubes, but the inner tubes obviously show a dominant diameter of about 50 nm, and the outer tubes have a secondary maximum diameter of about 110 nm. These observations suggest that the new walls of the CTITs are assembled both around and within the initial tubes, leading to larger-diameter outer tubes and smaller-diameter inner tubes, respectively. From the relative peak areas in the diameter distribution, we estimate that roughly 65% of the CTITs are formed from interior assembly and the rest are formed through exterior assembly.

The CTITs exhibit three types of distinct morphologies, likely associated with the different assembling mechanisms (around and inside tubes). One type exhibits relatively small and uniform interval spaces along the length and normally shows rather similar and matched shapes, windings, or nodes between the outer and inner tubes (FIGS. 2a, 2b). These characteristics suggest that this type of CTIT is formed from an external re-integration of the graphitic fragments around the pristine inner tubes (FIG. 2c). In this case, the pristine inner tubes may serve as structure-directed templates, similar to the formation of inorganic material sheathed CNTs[8,10]. The second type has large and highly irregular interval spaces; the winding of the inner tubes obviously differs from that of the outer tubes (FIGS. 2d, 2e). The thin inner tubes of less than 50 nm as shown in FIG. 1e are normally observed for this type of CTIT, meaning that they are newly formed from the reorganization of the graphene fragments contained inside pristine tubes (FIG. 2f). It seems clear that in this case, the new inner tubes assemble freely to some extent, although the assembly is confined in the channels of the pristine outer tubes. More interestingly, another type of CTITs shows triple tubular structures (FIG. 2g). We believe that they are formed from integrating the carbon fragments both around and inside the pristine tubes (FIG. 2h). Although this type of CTIT constitutes only a small fraction (about 1%) of the CTITs, their presence strongly supports the existence of both exterior and-interior assembling mechanisms.

Unlike the pristine tube moieties that show well-ordered fishbone-like graphene structures with interlayer distances of 0.34 nm (FIG. 7), the newly formed outer or inner tube moieties exhibit pre-graphitic short-range-ordered structure, with larger interlayer distances of about 0.35 nm and many discontinued and dislocated defects (FIG. 3a). Such a structure is likely associated with the intrinsic characteristic of the wet chemical integration of the small graphene fragments, in which oxygen atoms are highly incorporated due to the ester linkages. Upon thermal treatment in inert atmosphere at 1000° C., the involved oxygen-containing groups are decomposed and released as $CO_X$ gases, and the remaining carbon structures are significantly condensed and improved (FIG. 3b), although discontinued and dislocated defects are still in existence. Further tailoring of the structures into well-ordered graphene structures is possible by the graphitization reaction at higher temperatures[30].

It is also shown that the multiple channels and surfaces of the CTITs are readily accessible for guest materials such as iron oxides. Simply refluxing iron nitrate solution suspended with as-synthesized CTITs leaves behind uniform small iron oxide nanoparticles that are filled in the cylindrical and interval spaces of CTITs and coated on the multiple surfaces (FIG. 4). This indicates that the dual and triple CTITs are versatile precursors to various host-guest heterostructures or nanocomposites, as is the cases for normal CNTs[1,2,8-11].

In summary, regular and well-organized CTITs, with both dual and triple encasing structures, are successfully assembled by a wet chemical re-organization of the carbonaceous impurities around and inside pristine nanotubes. The multiple channels and surfaces of the CTITs are readily accessible for guest materials and allow the casting of nanotube-based host-guest heterostructures. This easy-produce wet chemical approach makes it possible to obtain CTITs at low cost and on a large scale, and provides wider opportunity for exploration of the fundamental properties and potential applications (e.g. in chemical separation and sensing, catalysis, hydrogen storage, $Li^+$ ion battery, and template-based assembly of heterostructures).

REFERENCES

1. G. Che, B. B. Lakshmi, E. R. Fisher, C. R. Martin, *Nature* 1998, 393, 346-349.
2. F. T. Edelmann, *Angew. Chem. Int Ed*. 1999, 38, 1381-1387.
3. G. Mestal, N. I. Maksimova, N. Keller, V. V. Roddatis, R. Schloegl, *Angw. Chem. Int. Ed*. 2001, 40, 2066-2068.
4. J. M. Planeix, N. Coustel, B. Coq, V. Brotons, P. S. Kumbhar, R. Dutartre, P. Geneste, P. Bernier, P. M. Ajayan, *J. Am. Chem. Soc*. 1994, 116, 7935-7936.
5. A. Modi, N. Koratkar, E. Lass, B. Wei, P. M. Ajayan, *Nature* 2003, 424, 171-174.
6. P. Collins, K. Bradley, M. Ishigami, A. Zettl, *Science* 2000, 287, 1801-1804.
7. J. Kong, N. R. Franklin, C. Zhou, M. G. Chapline, S. Peng, K. Cho, H. Dai, *Science* 2000, 287, 622-625.
8. P. M. Ajayan, O. Stephan, Ph. Redlich, C. Colliex, *Nature* 1995, 375, 564-567.
9. P. M. Ajayan, T. W. Ebbesen, T. Ichihashi, S. Iijima, K. Tanigaki, H. Hiura, *Nature* 1993, 362, 522-525.

10. R. L. D. Whitby, W. K. Hsu, C. B. Boothroyd, P. K. Fearon, H. W. Kroto, D. R. M. Walton, *Chem Phys Chem* 2001, 10, 620-623.
11. S. C. Tsang, Y. K. Chen, P. J. F. Harris, M. L. H. Green, *Nature* 1994, 372, 159-162.
12. M. S. Dresselhaus, G. Dresselhaus, P. C. Eklund, *Science of Fullerenes and Carbon Nanotubes*, Academic Press, San Diego, 1996.
13. P. M. Ajayan, *Chem. Rev.* 1999, 99, 1787-1799.
14. H. J. Dai, *Topics Appl. Phys.* 2001, 80, 29-53.
15. Y. Lu, Z. P. Zhu, W. Z. Wu, Z. Y. Liu, *Chem. Commun.* 2002, (21) 2740-2741.
16. T. W. Ebbesen, P. M. Ajayan, H. Hiura, K. Tanigaki, *Nature* 1994, 367, 519.
17. H. Hiura, T. W. Ebbesen, K. Tanigaki, *Adv. Mater.* 1995, 7, 275-276.
18. J. Liu, A. G. Rinzler, H. Dai, J. H. Hafner, R. K. Bradley, P. J. Boul, A. Lu, T. Iverson, K. Shelimov, C. B. Huffman, F. Rodriguez-Macias, Y. S. Shon, T. R. Lee, D. T. Colbert, R. E. Smalley, *Science* 1998, 280, 1253-1256.
19. A. C. Dillon, T. Gennett, K. M. Jones, J. L. Alleman, P. A. Parilla, M. J. Heben, *Adv. Mater.* 1999, 11, 1354-1358.
20. K. Tohji, T. Goto, H. Takahashi, Y. Shinoda, N. Shimizu, B. Jeyadevan, I. Matsuoka, Y. Saito, A. Kasuya, T. Ohsuna, K. Hiraga, Y. Nishina, *Nature* 1996, 383, 679.
21. A. R. Harutyunyan, B. K. Pradhan, J. Chang, G. Chen, P. C. Eklund, *J. Phys. Chem.* 2002, 106, 8671-8675.
22. P. X. Hou, S. Bai, Q. H. Yang, C. Liu, H. M. Cheng, *Carbon* 2002, 40, 81-85.
23. O. Zhou, R. M. Fleming, D. W. Murphy, C. H. Chen, R. C. Haddon, A. P. Ramirez, S. H. Glarum, *Science* 1994, 263, 1744-1747.
24. S. Iijima, *Nature* 1991, 354, 56-58.
25. T. W. Ebbesen, P M. Ajayan, *Nature* 1992, 358, 220-222.
26. S. C. Tsang, P. J. F. Harris, M. L. H. Green, *Nature* 1993, 362, 520-522.
27. D. E. Luzzi, B. W. Smith, *Carbon* 2000, 38, 1751-1756.
28. S. Bandow, M. Takizawa, K. Hirahara, M. Yudasaka, S. Iijima, *Chem. Phys. Lett.* 2001, 337, 48-54.
29. J. B. Donnet, T. K. Wang, S. Rebouillat, J. C. M. Peng, *Carbon Fibers*, Marcel Dekker, Inc. NewYork, 1998, p170-175.
30. R. Andrews, D. Jacques, D. Qian, E. C. Dickey, *Carbon* 2001, 39, 1681-1687.

The invention claimed is:

1. A method for producing a carbon tube-in-tube (CTIT) nanostructure material comprising the steps:
   (a) subjecting a carbon nanotube (CNT) starting material to a functionalization procedure, wherein CNT fragments with chemically reactive hydroxyl and/or carboxyl groups are obtained;
   (b) assembling, by esterification, said carbon nanotube fragments to a CTIT nanostructure material by treating said CNT fragments with an esterification catalyst to form ester bonds between said chemically reactive hydroxyl and carboxyl groups on said CNT fragments, and
   (c) optionally subjecting the CTIT nanostructure material to a thermal treatment.

2. The method of claim 1, wherein the CNT starting material comprises tubes with an average diameter of about 40-120 nm.

3. The method of claim 1, wherein the functionalization procedure comprises an oxidation, wherein CNT fragments with hydroxyl and carboxyl groups are obtained.

4. The method of claim 3, wherein the oxidation comprises treatment with $HNO_3$ or $HNO3/H_2SO_4$.

5. The method of claim 1, wherein the esterification catalyst is an acid.

6. The method of claim 1, wherein the assembling procedure comprises:
   (i) forming a tube with a higher average diameter compared to the CNT starting material around a tube with about the same diameter as the CNT starting material;
   (ii) forming a tube with a lower average diameter compared to the CNT starting material within a tube with about the same diameter as the CNT starting material; and/or
   (iii) a combination of (i) and (ii).

7. The method of claim 1, wherein the thermal treatment (c) comprises heating at a temperature of at least 800° C. in an inert atmosphere.

8. The method of claim 1, wherein the CTIT nanostructures comprise
   (i) an inner tube with an average diameter of about 10-60 nm; and
   (ii) an outer tube with an average diameter of about 60-80 nm.

9. The method of claim 1, wherein the CTIT nanostructures comprise
   (i) an inner tube with an average diameter of about 60-80 nm; and
   (ii) an outer tube with an average diameter of about 100-150 nm.

10. The method of claim 1, wherein the CTIT nanostructures comprise
    (i) an inner tube with an average diameter of about 10-60 nm,
    (ii) an intermediate tube with an average diameter of about 60-80 nm, and
    (iii) an outer tube with an average diameter of about 100-150 nm.

11. The method of claim 1, further comprising incorporating heterologous material into the CTIT nanostructures.

12. The method of claim 11, wherein the heterologous material comprises metals or metal compounds.

13. The method of claim 5, wherein the acid is $H_2SO_4$.

14. The method of claim 2, wherein the CNT starting material comprises tubes with an average diameter of about 60-80 nm.

15. The method of claim 8, wherein the CTIT nanostructures comprise
    (i) an inner tube with an average diameter of about 15-50 nm; and
    (ii) an outer tube with an average diameter of about 70 nm.

16. The method of claim 9, wherein the CTIT nanostructures comprise
    (i) an inner tube with an average diameter of about 70 nm; and
    (ii) an outer tube with an average diameter of about 110 nm.

17. The method of claim 10, wherein the CTIT nanostructures comprise
    (iii) an inner tube with an average diameter of about 15-50 nm,
    (iv) an intermediate tube with an average diameter of about 70 nm, and
    (iii) an outer tube with an average diameter of about 110 nm.

18. The method of claim 12, wherein the heterologous material comprises metals or metal compounds.

* * * * *

UNITED STATES PATENT AND TRADEMARK OFFICE
CERTIFICATE OF CORRECTION

PATENT NO. : 7,393,565 B2 Page 1 of 1
APPLICATION NO. : 11/113327
DATED : July 1, 2008
INVENTOR(S) : Zhenping Zhu et al.

It is certified that error appears in the above-identified patent and that said Letters Patent is hereby corrected as shown below:

On the title page insert item

-- (30) Foreign Application Priority Data

April 26, 2004 (EPO) 04 009 874.1 --

Signed and Sealed this

Seventh Day of July, 2009

JOHN DOLL
*Acting Director of the United States Patent and Trademark Office*